(12) United States Patent
Torre

(10) Patent No.: US 10,806,250 B1
(45) Date of Patent: Oct. 20, 2020

(54) SERVING TABLE INSERT AND METHOD

(71) Applicant: Salvatore Torre, Lafayette, NJ (US)

(72) Inventor: Salvatore Torre, Lafayette, NJ (US)

( * ) Notice: Subject to any disclaimer, the term of this patent is extended or adjusted under 35 U.S.C. 154(b) by 0 days.

(21) Appl. No.: 16/785,871

(22) Filed: Feb. 10, 2020

(51) Int. Cl.
| | | |
|---|---|---|
| *A47B 13/16* | (2006.01) | |
| *A47B 31/00* | (2006.01) | |
| *A47J 39/02* | (2006.01) | |
| *A47B 31/02* | (2006.01) | |

(52) U.S. Cl.
CPC ............ *A47B 13/16* (2013.01); *A47B 31/00* (2013.01); *A47J 39/02* (2013.01); *A47B 31/02* (2013.01)

(58) Field of Classification Search
CPC ....... A47J 36/2483; A47J 29/02; A47B 13/14; A47B 13/16; A47B 2031/026; A47B 31/02
USPC .............. 108/25, 26, 26.2, 50.13; 126/25 A; 219/218, 201
See application file for complete search history.

(56) References Cited

U.S. PATENT DOCUMENTS

| | | | | |
|---|---|---|---|---|
| 83,328 | A * | 10/1868 | Shattuck ................. | B43L 25/00 108/26.2 |
| 878,922 | A * | 2/1908 | Wolz ...................... | B43L 25/00 108/26.2 |
| 1,972,202 | A * | 9/1934 | Purves ................... | A47B 39/12 108/26.2 |
| 2,556,000 | A * | 6/1951 | Roberts .................. | B43L 25/00 108/26.2 |
| 2,847,552 | A * | 8/1958 | Gates ..................... | F24C 7/006 219/434 |
| 2,890,462 | A | 6/1959 | Ross | |
| 3,944,109 | A | 3/1976 | Holz | |
| 4,739,580 | A * | 4/1988 | Simmons ............. | A47B 3/0818 47/17 |
| 4,759,276 | A * | 7/1988 | Segroves ............ | A47J 37/0713 126/25 R |
| 4,899,027 | A * | 2/1990 | Wong .................... | A47B 31/02 219/218 |
| 5,699,784 | A | 12/1997 | Tippmann et al. | |
| 6,186,055 | B1 * | 2/2001 | DeMars ............. | A47J 37/0781 219/214 |
| 6,513,671 | B2 * | 2/2003 | Dicello ................... | A47J 47/16 220/23.4 |
| 6,612,124 | B1 * | 9/2003 | Hatch .................... | A47F 10/06 220/661 |
| 6,681,684 | B1 * | 1/2004 | Chen ..................... | A47G 19/02 206/509 |
| 6,769,906 | B1 * | 8/2004 | Grove .................... | F23D 14/28 126/519 |
| 8,575,520 | B2 * | 11/2013 | Garr ..................... | A47J 36/2483 126/273 R |
| 9,468,289 | B2 | 10/2016 | Sambonet | |
| 10,117,513 | B1 * | 11/2018 | Tolentino ............... | A47B 31/04 |
| 2006/0288997 | A1 * | 12/2006 | Griffin .................... | A47J 36/26 126/33 |

(Continued)

*Primary Examiner* — Jose V Chen
(74) *Attorney, Agent, or Firm* — Arthur Jacob

(57) ABSTRACT

A serving table insert and method present a food serving tray at a serving location elevated above a serving tabletop. A visible portion of an external surface on the insert carries a decorative feature viewable upon presentation of the food serving tray supported by the insert. The insert extends over an altitudinal distance of a magnitude sufficient to accommodate a food serving tray chosen from a series of food serving trays of selected capacities provided by a range of depths.

17 Claims, 2 Drawing Sheets

(56) References Cited

U.S. PATENT DOCUMENTS

| | | | |
|---|---|---|---|
| 2007/0034200 A1 | 2/2007 | Torre | |
| 2008/0110870 A1* | 5/2008 | Mirkes | A47J 36/2483 |
| | | | 219/218 |
| 2012/0309285 A1* | 12/2012 | Majordy | F24F 5/00 |
| | | | 454/254 |
| 2013/0292388 A1* | 11/2013 | Ottenwalder | A47G 23/04 |
| | | | 220/574.2 |
| 2014/0339220 A1* | 11/2014 | Metz | H05B 6/12 |
| | | | 219/621 |

* cited by examiner

US 10,806,250 B1

1

SERVING TABLE INSERT AND METHOD

The present invention relates generally to food service and pertains, more specifically, to food service implements and methods wherein prepared foods, sometimes heated or cooled, are presented in food service trays for selection by patrons at food service venues.

It has become quite common in food service venues, such as restaurants, diners, catering establishments, and other food service sites, to offer to patrons prepared food items presented in food service trays arranged for self-service at a food service tabletop, commonly referred to as a "buffet", where such food service trays are arranged, usually over either a heating chamber such as that provided by a steam table, or over a cooling chamber, such as that provided by a refrigeration apparatus, for convenient display and selection.

The present invention provides improvements in implements and methods by which prepared foods are presented at food service venues while facilitating and, at the same time, rendering more aesthetically pleasing, the presentation of prepared foods to a patron. As such, the present invention attains several objects and advantages, some of which are summarized as follows: Offers to patrons, convenient and attractive presentation of prepared foods for ready selection at a food service venue; enables an aesthetically pleasing presentation of prepared foods at a now-conventional food service venue; provides a versatile presentation of prepared foods offered in food service trays of selected capacity; facilitates the maintenance and presentation of heated or cooled prepared foods in a convenient and aesthetically pleasing display; provides for an aesthetically attractive presentation of prepared foods at a heretofore conventional prepared food service location; enables a simple and economical aesthetically pleasing presentation for self-service of prepared foods; provides easily maintained and readily placed into service an effective adjunct in the presentation of prepared foods for self-service selection; offers an inexpensive adjunct to self-service food presentation arrangements, promoting ease of presentation and selection of a wide variety of prepared foods; provides an economical addition to prepared food service presentation capable of exemplary service over an extended service life.

The above objects and advantages are attained by the present invention which may be described briefly as a serving table insert for presenting a food serving tray at a serving location elevated above a tabletop, wherein the tabletop extends over a treating chamber and has an aperture of transverse dimensions for providing the presented food serving tray with access to the treating chamber, the serving table insert comprising: an annular wall extending between an open bottom end and an open top end spaced attitudinally from the open bottom end; the annular wall including an external surface extending along the annular wall; a support ledge extending peripherally along the external surface of the annular wall, intermediate the open top end and the open bottom end, spaced an altitudinal distance from the open top end, and projecting a lateral distance enabling the support ledge to extend laterally beyond the transverse dimensions of the aperture in the tabletop for supporting the annular wall within the tabletop upon insertion of the open bottom end into the aperture within the tabletop; a support rim juxtaposed with the open top end of the annular wall for supporting a selected food serving tray upon the serving table insert, elevated attitudinally above the tabletop while exposed to the treating chamber; and a visible portion of the external surface of the annular wall, between the support ledge and the support rim, the visible portion of the external surface being viewable upon presentation of the food serving tray supported by the serving table insert.

In addition, the present invention provides a method for presenting a food serving tray at a serving location elevated above a tabletop, wherein the tabletop extends over a treating chamber and has an aperture of transverse dimensions for providing the presented food serving tray with access to the treating chamber, the method comprising: inserting into the aperture, a serving table insert having an annular wall extending between an open bottom end and an open top end spaced attitudinally from the open bottom end; including on the annular wall, an external surface extending along the annular wall; providing the serving table insert with a support ledge extending peripherally along the external surface of the annular wall, intermediate the open top end and the open bottom end, spaced an altitudinal distance from the open top end, and projecting a lateral distance enabling the support ledge to extend laterally beyond the transverse dimensions of the aperture in the tabletop for supporting the annular wall within the tabletop upon insertion of the open bottom end into the aperture within the tabletop; juxtaposing a support rim with the open top end of the annular wall for supporting a selected food serving tray upon the serving table insert, elevated attitudinally above the tabletop while exposed to the treating chamber; and extending a visible portion of the external surface of the annular wall between the support ledge and the support rim, such that the visible portion of the external surface is viewable upon presentation of the food serving tray supported by the serving table insert.

The invention will be understood more fully, while still further objects and advantages will become apparent, in the following detailed description of preferred embodiments of the invention illustrated in the accompanying drawing in which.

Figure 1:
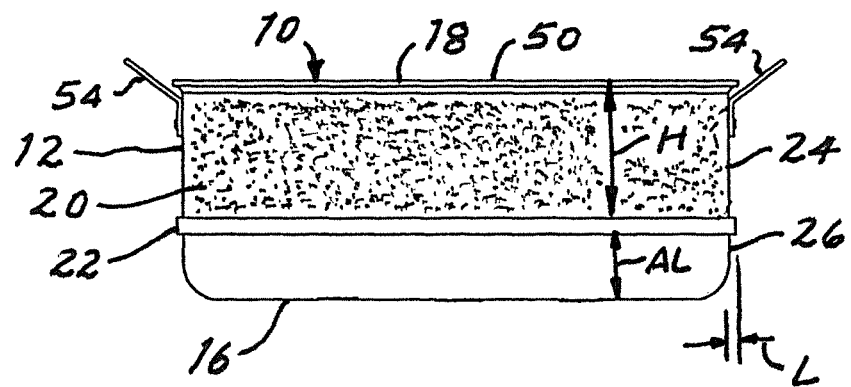
FIG. 1 is a front elevational view of a serving table insert constructed in accordance with the present invention.
Figure 2:
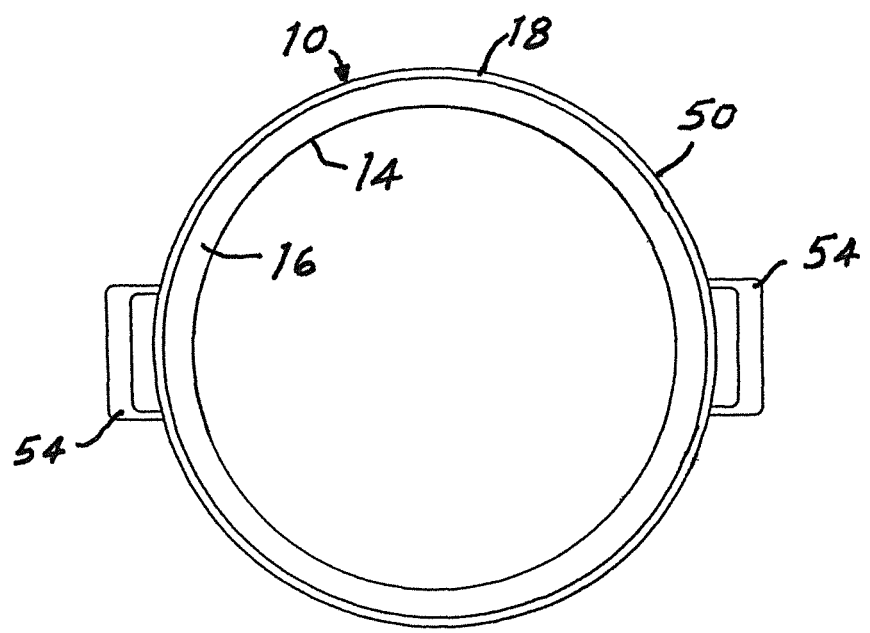
FIG. 2 is a top plan view of the serving table insert.

Referring now to the drawing, and especially to FIGS. 1 and 2 thereof, a serving table insert constructed in accordance with the present invention is depicted at 10 and is seen to include an annular wall 12 extending between an opening 14 at an open bottom end 16, and an open top end 18 spaced altitudinally from the open bottom end 16. An external surface 20 extends along the annular wall 12 and a support ledge 22 extends peripherally along the external surface 20 intermediate the open top end 18 and the open bottom end 16. Support ledge 22 is spaced an altitudinal distance H from open top end 18 and projects laterally from annular wall 12, intermediate the open top end 18 and the open bottom end 16, over a lateral distance L, thereby dividing the annular wall 12 into an upper section 24 and a lower section 26. In the preferred construction, annular wall 12 is in the form of a cylindrical structure having a circular cross-sectional configuration, as seen in FIG. 2, and support ledge 22 extends circumferentially substantially fully around external surface 20 of annular wall 12.

Figure 3:
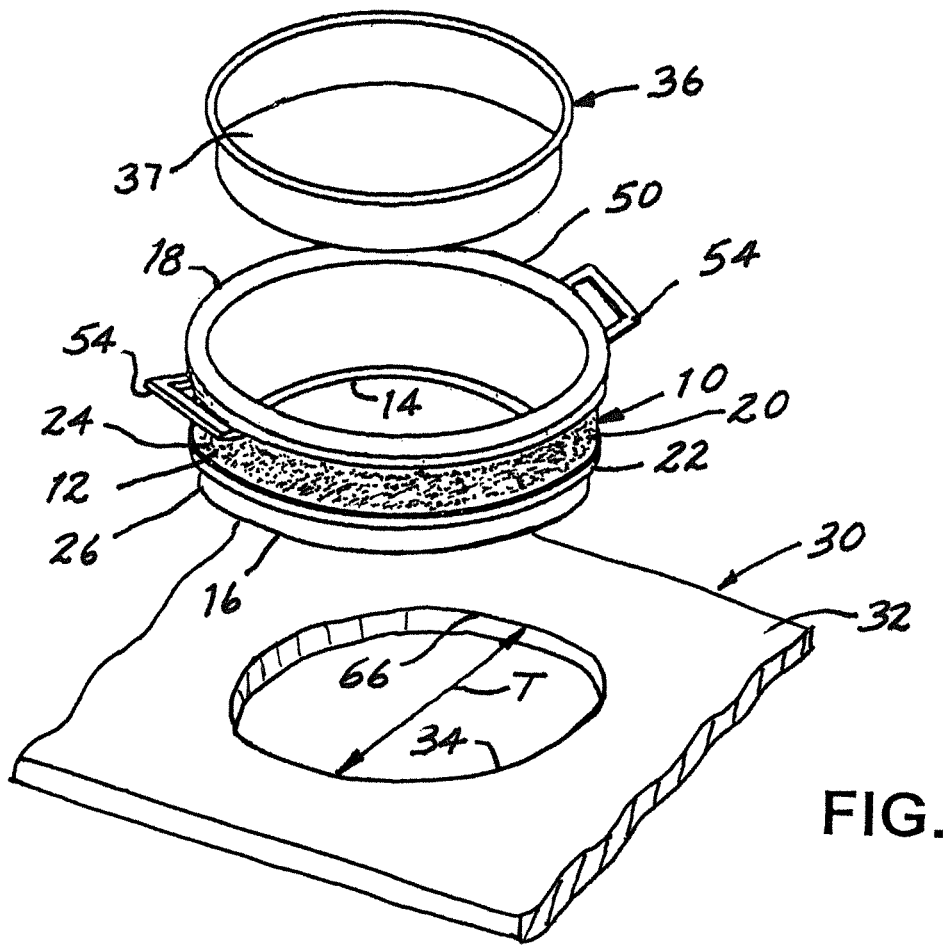
FIG. 3 is an exploded pictorial perspective view of the serving table insert being placed into use in accordance with the present invention.
Figure 4:
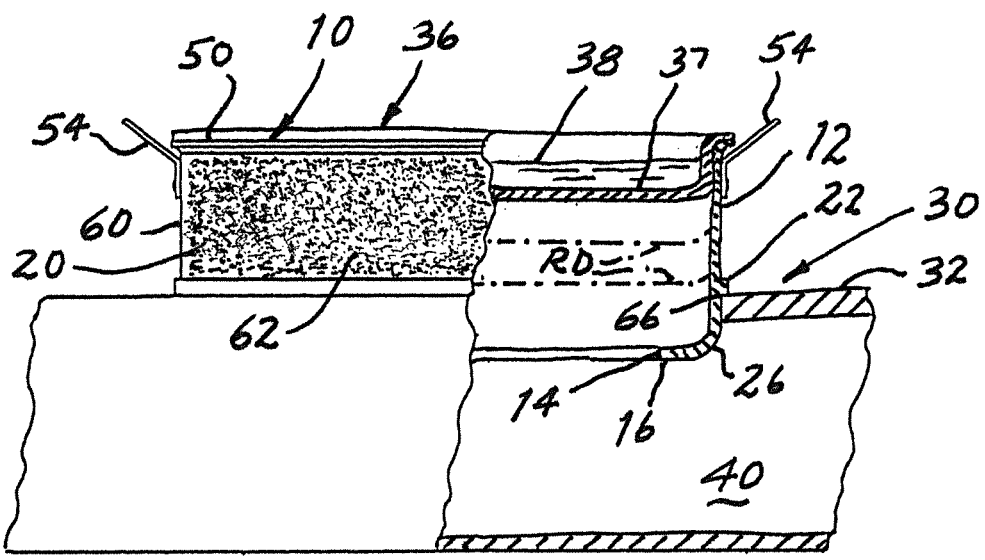
FIG. 4 is a front elevational view, partially sectioned, illustrating implementation of the serving table insert.

Turning now to FIGS. 3 and 4, as well as to FIGS. 1 and 2, a food service location is illustrated at 30 and is seen to include a tabletop 32 having an aperture 34 of transverse dimensions T, ordinarily provided for the reception of a food serving tray, here depicted at 36 and having a bottom 37, to complete the presentation of prepared food, shown at 38, at the food service location 30. Tabletop 32 extends over a treating chamber 40 within which treating chamber 40 there is provided either a higher temperature or a lower temperature, for transmission through opening 14 in section 26 at the bottom end 16 of annular wall 12 for heating or cooling food 38 carried by food serving tray 36. Ordinarily, heating is accomplished by steam provided within treating chamber 40, or cooling is accomplished by refrigeration within chamber 40, in a now-conventional manner. A support rim 50 is juxtaposed with the open top end 18 of annular wall 12 for supporting food serving tray 36 upon serving table insert 10 in position to be exposed, through opening 14, to heating or cooling provided within treating chamber 40. Handles 54 facilitate handling of serving table insert 10.

While lower section 26 has an axial extent AL for entering treating chamber 40, height H of upper section 24 elevates food serving tray 36 for presenting food 38 at a convenient level while enabling the accommodation of food serving trays having any one of a series of selected capacities, provided by a range of depths, as illustrated in phantom at RD in FIG. 4.

At the same time, a visible portion 60 of external surface 20 of the annular wall 12, between support ledge 22 and support rim 50, is viewable by patrons to whom food 38 is being presented. Accordingly, visible portion 60 carries a decorative feature 62 such as, for example, a hammered finish, for aesthetically enhancing the presentation of prepared food 38 at the conveniently elevated serving location 30. Further, support ledge 22, by virtue of extending circumferentially substantially fully around external surface 20, masks from view aperture edge 66 of aperture 34 and, consequently, conceals any imperfections or gaps that may be present along aperture edge 66, thereby enhancing the aesthetically pleasing appearance presented at serving location 30.

It will be seen that the present invention attains all of the objects and advantages summarized above, namely: Offers to patrons, convenient and attractive presentation of prepared foods for ready selection at a food service venue; enables an aesthetically pleasing presentation of prepared foods at a now-conventional food service venue; provides a versatile presentation of prepared foods offered in food service trays of selected capacity; facilitates the maintenance and presentation of heated or cooled prepared foods in a convenient and aesthetically pleasing display; provides for an aesthetically attractive presentation of prepared foods at a heretofore conventional prepared food service location; enables a simple and economical aesthetically pleasing presentation for self-service of prepared foods; provides easily maintained and readily placed into service an effective adjunct in the presentation of prepared foods for self-service selection; offers an inexpensive adjunct to self-service food presentation arrangements, promoting ease of presentation and selection of a wide variety of prepared foods; provides an economical addition to prepared food service presentation capable of exemplary service over an extended service life.

It is to be understood that the above detailed description of preferred embodiments of the invention is provided by way of example only. Various details of design, construction and procedure may be modified without departing from the true spirit and scope of the invention, as set forth in the appended claims.

The embodiments of the invention in which an exclusive property or privilege is claimed are defined as follows:

1. A serving table insert for presenting a food serving tray at a serving location elevated above a tabletop, wherein the tabletop extends over a treating chamber and has an aperture of transverse dimensions for providing the presented food serving tray with access to the treating chamber, the serving table insert comprising:
   an annular wall extending between an open bottom end and an open top end spaced altitudinally from the open bottom end;
   the annular wall including an external surface extending along the annular wall;
   a support ledge extending peripherally along the external surface of the annular wall, intermediate the open top end and the open bottom end, spaced an altitudinal distance from the open top end, and projecting a lateral distance for supporting the annular wall within the tabletop upon insertion of the open bottom end into the aperture within the tabletop;
   a support rim juxtaposed with the open top end of the annular wall for supporting a selected food serving tray upon the serving table insert, for elevating the table insert above the tabletop while exposed to the treating chamber; and
   a visible portion of the external surface of the annular wall, between the support ledge and the support rim, the visible portion of the external surface being viewable upon presentation of the food serving tray supported by the serving table insert.

2. The serving table insert of claim 1 including a decorative feature on the visible portion of the external surface of the annular wall.

3. The serving table insert of claim 1 wherein the aperture includes an aperture edge, and the support ledge extends circumferentially substantially fully around the external surface of the annular wall such that upon insertion of the open bottom end into the aperture, the aperture edge will be masked from view by the support ledge.

4. The serving table insert of claim 3 wherein the annular wall comprises a circular cross-sectional configuration.

5. The serving table insert of claim 4 including a decorative feature on the visible portion of the external surface of the annular wall.

6. The serving table insert of claim 1 wherein the altitudinal distance between the open top end and the support ledge is of a magnitude sufficient to accommodate a food serving tray selected from food serving trays having a range of depths.

7. The serving table insert of claim 6 including a decorative feature displayed on the visible portion of the external surface of the annular wall.

8. The serving table insert of claim 6 wherein the aperture includes an aperture edge, and the support ledge extends circumferentially substantially fully around the external surface of the annular wall such that upon insertion of the open bottom end into the aperture, the aperture edge will be masked from view by the support ledge.

9. The serving table insert of claim 8 wherein the annular wall comprises a circular cross-sectional configuration.

10. The serving table insert of claim 9 including a decorative feature on the visible portion of the external surface of the annular wall.

11. A method for presenting a food serving tray at a serving location elevated above a tabletop, wherein the tabletop extends over a treating chamber and has an aperture of transverse dimensions for providing the presented food serving tray with access to the treating chamber, the method comprising:

inserting into the aperture, a serving table insert having an annular wall extending between an open bottom end and an open top end spaced altitudinally from the open bottom end;

including on the annular wall, an external surface extending along the annular wall;

providing the serving table insert with a support ledge extending peripherally along the external surface of the annular wall, intermediate the open top end and the open bottom end, spaced an altitudinal distance from the open top end, and projecting a lateral distance for supporting the annular wall within the tabletop upon insertion of the open bottom end into the aperture within the tabletop;

juxtaposing a support rim with the open top end of the annular wall for supporting a selected food serving tray upon the serving table insert, for elevating the table insert above the tabletop while exposed to the treating chamber; and extending a visible portion of the external surface of the annular wall between the support ledge and the support rim, such that the visible portion of the external surface is viewable upon presentation of the food serving tray supported by the serving table insert.

12. The method of claim 11 including displaying a decorative feature on the visible portion of the external surface of the annular wall.

13. The method of claim 11 wherein the aperture includes an aperture edge, the method including extending the support ledge circumferentially substantially fully around the external surface of the annular wall such that upon insertion of the open bottom end into the aperture, the aperture edge will be masked from view by the support ledge.

14. The method of claim 13 including providing the annular wall with a circular cross-sectional configuration.

15. The method of claim 14 including displaying a decorative feature on the visible portion of the external surface of the annular wall.

16. The method of claim 11 including providing the altitudinal distance between the open top end and the support ledge with a magnitude sufficient to accommodate a food serving tray selected from food serving trays having a range of depths.

17. The method of claim 16 including displaying a decorative feature on the visible portion of the external surface of the annular wall.

* * * * *